W. M. BRADSHAW.
SHAFT BEARING.
APPLICATION FILED SEPT. 20, 1906.

1,067,860.

Patented July 22, 1913.

WITNESSES:
C. L. Belcher
Otto S. Schairer

INVENTOR
William M. Bradshaw
BY
Iksley I. Carr
ATTORNEY

UNITED STATES PATENT OFFICE.

WILLIAM M. BRADSHAW, OF WILKINSBURG, PENNSYLVANIA, ASSIGNOR TO WESTINGHOUSE ELECTRIC & MANUFACTURING COMPANY, A CORPORATION OF PENNSYLVANIA.

SHAFT-BEARING.

1,067,860.

Specification of Letters Patent.

Patented July 22, 1913.

Application filed September 20, 1906. Serial No. 335,510.

*To all whom it may concern:*

Be it known that I, WILLIAM M. BRADSHAW, a citizen of the United States, and a resident of Wilkinsburg, in the county of Allegheny and State of Pennsylvania, have invented a new and useful Improvement in Shaft-Bearings, of which the following is a specification.

My invention relates to shaft bearings, and particularly to such as are employed in measuring instruments and devices of similar character.

The object of my invention is to so construct and arrange the parts of instruments and similar devices having rotatable members that are mounted upon jeweled or other delicate bearings that the jewels and delicate parts may be relieved of the weights of the movable members and protected from injury during transportation of the devices.

Figure 1:
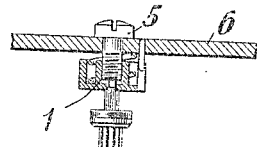
Figure 2:
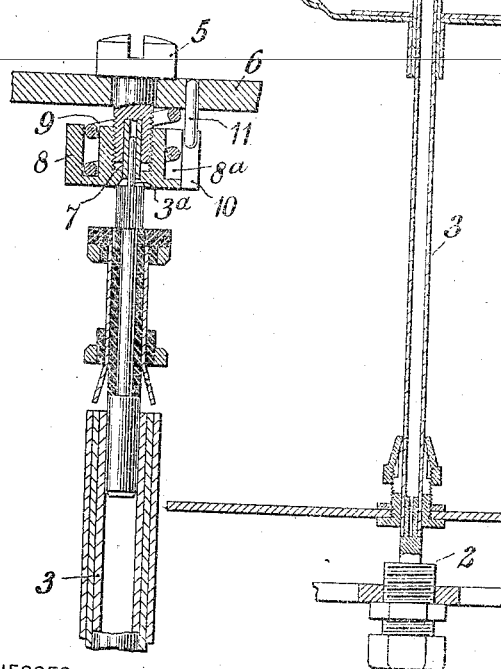
Figure 3:
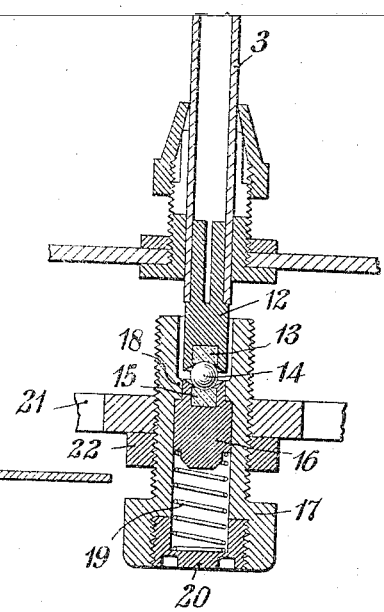

Figure 1 of the accompanying drawing is a vertical sectional view through the bearings and movable member of an instrument that embodies my invention. Fig. 2 is an enlarged vertical sectional view through the upper bearing shown in Fig. 1, and Fig. 3 is a similar view of the lower bearing shown in Fig. 1.

Mounted between bearings 1 and 2 is a shaft 3 that carries a movable member 4 which, in the present instance, is the armature of an electrical measuring instrument. The bearing at 1 comprises a screw 5 having a smooth portion of its shank seated in a stationary part 6 of the instrument, and having a recess in its lower end in which is located a suitable bearing sleeve 7 for the upper reduced end 3ª of the shaft. Threaded upon the lower end of the screw 5 is a collar 8 having an annular recess 8ª in its upper face in which is located a helical compression spring 9 that serves to hold the collar 8 out of engagement with the part 6 and the head of the screw 5 in engagement with the upper face thereof. A slot 10 is provided in the outer edge of the collar 8 for the reception of a pin 11 that projects downwardly from the part 6, and thereby prevents rotation of the collar 8 as it is moved into and out of engagement with the shoulder upon the shaft 3 at the lower end of the part 3ª.

The lower end of the shaft 3 is provided with an extension 12, in the lower end of which is mounted a sapphire or other suitable jewel 13 having a concave lower face bearing upon a hardened steel ball 14 that rests upon a similar jewel 15. The jewel 15 is mounted in the upper end of a piece 16 that is fitted within a sleeve 17 having a flange or stop 18 upon its internal surface, against which the piece 16 is normally held by means of a helical compression spring 19 that is interposed between the piece 16 and a screw plug 20. The upper end of the sleeve 17 surrounds the extension 12 and serves to maintain the bearings in alinement and to prevent loss of the ball 14. The sleeve 17 is screw-threaded into a stationary part 21 of the instrument and is provided with a lock nut 22 for securing it in any position to which it may be adjusted when assembling the instrument.

In the ordinary operation of the instrument, the spring 19 maintains the piece 16 in the position shown and provides a resilient support for the movable element of the instrument. In order to prepare the instrument for transportation, the screw 5 should be adjusted so as to permit the spring 9 to cause the collar 8 to engage the shoulder upon the upper end of the shaft and thereby effect longitudinal movement of the shaft against the pressure exerted by the spring 19, until the extension 12 is caused to engage the flange or stop 18. It will, of course, be understood that the force exerted by the spring 9 is such as to overcome that exerted by the spring 19. The shaft of the instrument is thus rigidly supported and the bearing jewels are relieved from all jars and shocks that might result if the movable member were supported thereby during transportation of the instrument, and there is little or no danger of destroying or injuring the jewels.

While my invention has been shown and described as embodied in a specific structure, it will, of course, be understood that it may be employed in other structures, and that the structural details and arrangement of the parts may be considerably varied, without altering the mode of operation of the invention or departing from its spirit, and I desire that the invention be construed to cover all such modifications.

I claim as my invention:

1. The combination with a vertical shaft, a longitudinally movable block having a jewel bearing for the lower end of the shaft, a supporting spring for said block, a rotatable bearing for the upper end of said shaft, and a support for said rotatable bearing, of a collar that surrounds the bearing and the shaft and may be moved into and out of engagement with the shaft by rotation of the bearing, the said collar having an annular recess and resilient means interposed between the collar and the support and located in the said annular recess.

2. The combination with a vertical shaft, a longitudinally movable block having a jewel bearing for the lower end of said shaft, a supporting spring for said block, a rotatable bearing for the upper end of said shaft and a support for said rotatable bearing, of a collar that surrounds the bearing and the shaft and may be moved into and out of engagement with the shaft by rotation of the bearing, the said collar having an annular recess, resilient means interposed between the collar and the support and located in the said annular recess, and means for preventing rotation of the collar.

3. The combination with a vertical shaft, a longitudinally movable spring-supported bearing for the lower end of the shaft, a rotatable bearing for the upper end of said shaft and a support for said bearing, of a collar that is screw-threaded upon the bearing and may be moved into and out of engagement with the shaft by rotation of the bearing, the said collar having an annular recess, and resilient means interposed between the collar and support and located in the said annular recess.

4. The combination with a vertical shaft, a longitudinally movable spring-supported bearing for the lower end of the shaft, a rotatable bearing for the upper end of said shaft and a support for said bearing, of a collar that is screw-threaded upon the bearing and may be moved into and out of engagement with the shaft by rotation of the bearing, the said collar having an annular recess, resilient means interposed between the collar and the support and located in the said annular recess, and means for preventing rotation of the collar.

In testimony whereof, I have hereunto subscribed my name this 13th day of September, 1906.

WILLIAM M. BRADSHAW.

Witnesses:
OTTO S. SCHAIRER,
BIRNEY HINES.